(12) United States Patent
Guiheneuf et al.

(10) Patent No.: US 8,239,234 B2
(45) Date of Patent: *Aug. 7, 2012

(54) FREEFORM COMMUNICATION IN CALENDARING SYSTEM

(75) Inventors: Bertrand Guiheneuf, Paris (FR); Sébastien Maury, Paris (FR); Olivier Gutknecht, Paris (FR); Julien Jalon, Paris (FR)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/193,438

(22) Filed: Jul. 28, 2011

(65) Prior Publication Data

US 2011/0295641 A1    Dec. 1, 2011

Related U.S. Application Data

(63) Continuation of application No. 10/852,905, filed on May 24, 2004, now Pat. No. 7,991,637.

(51) Int. Cl.
*G06Q 10/00* (2012.01)
(52) U.S. Cl. ...................... 705/7.18
(58) Field of Classification Search .................. 705/7.18
See application file for complete search history.

(56) References Cited

U.S. PATENT DOCUMENTS

| | | | |
|---|---|---|---|
| 4,937,743 A | 6/1990 | Rassman et al. |
| 5,129,057 A | 7/1992 | Strope et al. |
| 5,247,438 A | 9/1993 | Subas et al. |
| 5,323,314 A | 6/1994 | Baber et al. |
| 5,371,844 A | 12/1994 | Andrew et al. |
| 5,457,476 A | 10/1995 | Jenson |
| 5,500,938 A | 3/1996 | Cahill et al. |
| 5,528,745 A | 6/1996 | King et al. |
| 5,619,637 A | 4/1997 | Henshaw et al. |
| 5,621,458 A | 4/1997 | Mann et al. |
| 5,621,876 A | 4/1997 | Odam et al. |
| 5,634,100 A | 5/1997 | Capps |
| 5,659,768 A | 8/1997 | Forbes et al. |
| 5,664,063 A | 9/1997 | Johnson et al. |

(Continued)

FOREIGN PATENT DOCUMENTS

EP    0276427    8/1988

(Continued)

OTHER PUBLICATIONS

Mackinlay, Jock D. et al. "Developing Calendar Visualizers for the Information Visualizer," *ACM*, UIST '94, Nov. 2-4, 1994, pp. 109-118.

(Continued)

*Primary Examiner* — Andre Boyce
(74) *Attorney, Agent, or Firm* — Blakely, Sokoloff, Taylor & Zafman LLP

(57) ABSTRACT

A method of sharing a calendar between a plurality of users, the calendar being capable of holding one or more events. The method comprises providing the calendar to each of said plurality of users; allowing any of said plurality of users to add to the calendar any of a new event, a change to an event and a message relating to an event; and providing any new event, change to an event or message added by a user to the other users. A change to an event may comprise a change to at least one of a start time of the event, an end time of the event, a description of the event, a status of the event, whether the event is to be repeated and the persons attending the event.

15 Claims, 12 Drawing Sheets

U.S. PATENT DOCUMENTS

| | | | |
|---|---|---|---|
| 5,761,646 | A | 6/1998 | Frid-Nielsen et al. |
| 5,805,163 | A | 9/1998 | Bagnas |
| 5,838,889 | A | 11/1998 | Booker |
| 5,842,009 | A | 11/1998 | Borovoy et al. |
| 5,855,006 | A | 12/1998 | Huemoeller et al. |
| 5,860,067 | A | 1/1999 | Onda et al. |
| 5,895,451 | A | 4/1999 | Yamade et al. |
| 5,899,979 | A | 5/1999 | Miller et al. |
| 5,920,313 | A | 7/1999 | Diedrichsen et al. |
| 5,960,406 | A | 9/1999 | Rasansky et al. |
| 6,014,135 | A | 1/2000 | Fernandes |
| 6,018,343 | A | 1/2000 | Wang et al. |
| 6,039,355 | A | 3/2000 | Durand |
| 6,064,975 | A | 5/2000 | Moon et al. |
| 6,073,110 | A | 6/2000 | Rhodes et al. |
| 6,085,166 | A | 7/2000 | Beckhardt et al. |
| 6,101,480 | A | 8/2000 | Conmy et al. |
| 6,167,379 | A | 12/2000 | Dean et al. |
| 6,222,549 | B1 | 4/2001 | Hoddie |
| 6,243,325 | B1 | 6/2001 | Tomono |
| 6,272,074 | B1 | 8/2001 | Winner |
| 6,278,456 | B1 | 8/2001 | Wang et al. |
| 6,369,840 | B1 | 4/2002 | Barnett et al. |
| 6,380,959 | B1 | 4/2002 | Wang et al. |
| 6,466,236 | B1 | 10/2002 | Pivowar et al. |
| 6,486,894 | B1 | 11/2002 | Abdelhadi et al. |
| 6,571,281 | B1 | 5/2003 | Nickerson |
| 6,604,079 | B1 | 8/2003 | Ruvolo et al. |
| 6,728,530 | B1 | 4/2004 | Heinonen et al. |
| 6,738,789 | B2 | 5/2004 | Multer et al. |
| 6,760,728 | B1 | 7/2004 | Osborn |
| 6,785,868 | B1 | 8/2004 | Raff |
| 6,868,426 | B1 | 3/2005 | Mankoff |
| 6,879,997 | B1 | 4/2005 | Ketola et al. |
| 7,007,041 | B2 | 2/2006 | Multer et al. |
| 7,039,596 | B1 | 5/2006 | Lu |
| 7,082,402 | B2 | 7/2006 | Conmy et al. |
| 7,096,232 | B2 | 8/2006 | Doss et al. |
| 7,188,073 | B1 | 3/2007 | Tam et al. |
| 7,233,933 | B2 | 6/2007 | Horvitz et al. |
| 7,296,232 | B1 | 11/2007 | Burdick et al. |
| 7,318,040 | B2 | 1/2008 | Doss et al. |
| 7,334,000 | B2 | 2/2008 | Chhatrapati et al. |
| 7,340,691 | B2 | 3/2008 | Bassett et al. |
| 7,353,465 | B2 | 4/2008 | Callaway et al. |
| 2001/0014867 | A1 | 8/2001 | Conmy |
| 2001/0044805 | A1 | 11/2001 | Multer et al. |
| 2001/0049617 | A1 | 12/2001 | Berenson et al. |
| 2002/0010807 | A1 | 1/2002 | Multer et al. |
| 2002/0040369 | A1 | 4/2002 | Multer et al. |
| 2002/0131565 | A1 | 9/2002 | Scheuring et al. |
| 2002/0165753 | A1 | 11/2002 | Worthington |
| 2002/0178060 | A1 | 11/2002 | Sheehan |
| 2002/0184321 | A1 | 12/2002 | Fishman et al. |
| 2002/0188607 | A1 | 12/2002 | Kogut-O'Connell et al. |
| 2002/0188620 | A1 | 12/2002 | Doss et al. |
| 2002/0191035 | A1 | 12/2002 | Selent |
| 2002/0196280 | A1 | 12/2002 | Bassett et al. |
| 2003/0045301 | A1 | 3/2003 | Wollrab |
| 2003/0050986 | A1 | 3/2003 | Matthews et al. |
| 2003/0065677 | A1 | 4/2003 | Culp et al. |
| 2003/0065742 | A1 | 4/2003 | Culp et al. |
| 2003/0129569 | A1 | 7/2003 | Callaway et al. |
| 2003/0149606 | A1 | 8/2003 | Cragun et al. |
| 2003/0154116 | A1 | 8/2003 | Lofton |
| 2003/0163537 | A1 | 8/2003 | Rohall et al. |
| 2003/0167664 | A1 | 9/2003 | Mullinax |
| 2004/0039779 | A1 | 2/2004 | Amstrong et al. |
| 2004/0073615 | A1 | 4/2004 | Darling |
| 2004/0109025 | A1 | 6/2004 | Hullot et al. |
| 2004/0122915 | A1 | 6/2004 | Saare et al. |
| 2004/0125142 | A1 | 7/2004 | Mock et al. |
| 2004/0172279 | A1 | 9/2004 | Carolan et al. |
| 2004/0215572 | A1 | 10/2004 | Uehara et al. |
| 2005/0125737 | A1 | 6/2005 | Allen et al. |
| 2005/0222971 | A1 | 10/2005 | Cary |
| 2006/0053043 | A1 | 3/2006 | Clarke |

FOREIGN PATENT DOCUMENTS

| | | |
|---|---|---|
| WO | WO 00/62146 | 10/2000 |
| WO | WO 00/62201 A1 | 10/2000 |
| WO | WO 01/49051 A1 | 7/2001 |
| WO | WO 02/44958 A1 | 6/2002 |
| WO | WO 02/089026 A2 | 11/2002 |

OTHER PUBLICATIONS

Silva, Sonia Fernandes et al. "Visualization of Linear Time-Oriented Data: a Survey," IEEE 2000, pp. 310-319.

Carlis, John V. et al. "Interactive Visualization of Serial Periodic Data," Proceedings of the 11th annual ACM Symposium on User Interface Software and Technology (UIST '98), San Francisco, Nov. 1998, pp. 1-10.

Jonsson, Martin et al. "Achieving Non-Intrusive Environments for Local Collaboration," The FUSE Research Group, Center for Wireless Systems, Kista, Sweden (2000), 14 pages.

Tullio, Joe et al. "Augmenting Shared Personal Calendars," Proceedings of the 15th annual ACM Symposium on User Interface Software and Technology (UIST '02), Paris, France, 4(2):11-20, Oct. 27-30, 2002.

Supplementary European Search Report for EP Application No. 03794665.4, dated Aug. 30, 2006 (3 pages).

PCT International Preliminary Examination Report for PCT International Appln. No. US2005/014619, mailed Dec. 7, 2006 (7 pages).

VAitA, OsaSync Frequently Asked Questions, Feb. 4, 2004, http://web.archive.org/web/20040204195815/http://www.vaita.com/faq.asp.

WindowsITPro, Replying to and Forwarding Messages, Jun. 6, 2003 http://web.archive.org/web/20030625191716/http://www.windowsitlibrary.com/Content/191/11/2.html.

Carlis, John V. et al., "Interactive Visualization of Serial Periodic Data," Proceedings of the 11$^{th}$ annual ACM Symposium on User Interface Software and Technology (UIST '98), San Francisco, Nov. 1998, pp. 1-10.

F. Dawson and D. Stenerson: "Internet Calendaring and Scheduling Core Object Specification (iCalendar)", Network Working Group, Request for Comments: 2445, Nov. 1998.

B. Mahoney, G. Babics, A. Taler: "Guide to Internet Calendaring", Network Working Group, Request for Comments: 3283, Jun. 2002.

PCT International Search Report for PCT Int'l Appln. No. US03/28247, mailed Feb. 13, 2004 (6 pages).

PCT Notification of Transmittal of the International Search Report or Declaration for PCT Int'l Appln. No. US03/28053, mailed Jun. 18, 2004 (5 pages).

D. Beard, M. Palanlappan, A. Humm, D. Banks, A. Nair, Y. Shan: "A Visual Calendar for Scheduling Group Meetings", Department of Computer Science, University of North Carolina, Chapel Hill, Oct. 1990 (pp. 279-290).

PCT Written Opinion for PCT International Appln. No. US03/28247, mailed Aug. 16, 2004 (5 pages).

PCT International Preliminary Examination Report for PCT Int'l. Appln. No. US03/28247, mailed Feb. 25, 2005 (6 pages).

PCT Written Opinion for PCT International Appln. No. US03/28053, mailed Sep. 16, 2004 (5 pages).

PCT International Preliminary Examination Report for PCT Int'l. Appln. No. US03/28053, mailed Mar. 3, 2005 (6 pages).

Timecruiser Computer Corporation, "Timecruiser User Guide", Version 1.5, Jul. 1998, downloaded on Aug. 3, 2005 at https://www.atd.net/timecruiser/doc, pp. 1-50.

Bisignano, Mario et al., "Experience: a Jxta middleware for mobile ad-hoc networks", Proceedings of the third International Conference on Peer-to-Peer Computing (P2P'03) 2003 IEEE, 2 pages.

Paluska, Justin Mazzola et al., "Footloose: A Case for Physical Eventual Consistency and Selective Conflict Resolution", Proceedings of the Fifth IEEE Workshop on Mobile Computing Systems & Applications (WMCSA 2003) 2003 IEEE, 10 pages.

Prasad, Sushil K. et al., "Enforcing Interdependencies and Executing Transactions Atomically Over Autonomous Mobile Data Stores Using SyD Link Technology", Proceedings of the 23$^{rd}$ International Conference on Distributed Computing Systems Workshops (ICDCSW'03) 2003 IEEE, 7 pages.

Prasad, Sushil K. et al., "Implementation of a Calendar Application Based on SyD Coordination Links", Proceedings of the International Parallel and Distributed Processing Symposium (IPDPS'03) 2003 IEEE, 8 pages.

PCT Notification of Transmittal of the International Search Report and Written Opinion of the International Searching Authority, or the Declaration, for the PCT Int'l. Appln. No. US2005/014619, mailed Sep. 2, 2005, (112 pages).

Fig.7.

| Step | User 1 | User 2 | User 3 |
|------|--------|--------|--------|
| 1 | $V_0$ | - | - |
| 2 | $V_0$ | $V_0$ | $V_0$ |
| 3 | $V_0$ | $V_0\ V_1$ | $V_0$ |
| 4 | $V_0\ V_1$ | $V_0\ V_1$ | $V_0$ |
| 5 | $V_0\ V_1$ | $V_0\ V_1$ | $V_0\ V_{1'}$ |
| 6 | $V_0\ V_1\ V_{1'}$ | $V_0\ V_1\ V_{1'}$ | $V_0\ V_{1'}\ V_1$ |
| 7 | $V_0\ V_1\ V_{1'}$ | $V_0\ V_1\ V_{1'}$ | $V_0\ V_1\ V_{1'}$ |

Fig.8.

| Step | User 1 | User 2 | User 3 |
|------|--------|--------|--------|
| 1 | $W_0$ | - | - |
| 2 | $W_0$ | $W_0$ | $W_0$ |
| 3 | $W_0$ | $W_0\ W_1$ | $W_0$ |
| 4 | $W_0$ | $W_0\ W_1$ | $W_0\ W_{1'}$ |
| 5 | $W_0\ W_{1'}$ | $W_0\ W_1$ | $W_0\ W_{1'}$ |
| 6 | $W_0\ W_{1'}\ W_1$ | $W_0\ W_1\ W_{1'}$ | $W_0\ W_{1'}\ W_1$ |
| 7 | $W_0\ W_1\ W_{1'}$ | $W_0\ W_1\ W_{1'}$ | $W_0\ W_1\ W_{1'}$ |

Fig.12.

| Step | User 1 | | User 2 | | User 3 | |
|---|---|---|---|---|---|---|
| 1 | $X_{00}$ | ☐ | - | | - | |
| 2 | $X_{00}$ | ☐ | $X_{00}$ | ☐ | $X_0$ | ☐ |
| 3 | $X_{00}$ | ☐ | $X_{00}$ $X_x$ | | $X_{00}$ $X_x$ | ☐ |
| 4 | $X_{00}$ $X_x$ | ☒ | $X_{00}$ $X_x$ | | $X_{00}$ $X_x$ | ☒ |
| 5 | $X_{00}$ $X_x$ | ☒ | $X_{00}$ $X_x$ | | $X_{00}$ $X_x$ | |
| 6 | $X_{00}$ $X_x$ $X_{01}$ | ☐ | $X_{00}$ $X_x$ | | $X_{00}$ $X_x$ | |
| 7 | $X_{00}$ $X_x$ $X_{01}$ | ☐ | $X_{00}$ $X_x$ $X_{01}$ | ☐ | $X_{00}$ $X_x$ $X_{01}$ | ☐ |

FREEFORM COMMUNICATION IN CALENDARING SYSTEM

This application is a continuation of U.S. application Ser. No. 10/852,905 filed on May 24, 2004, now issued as U.S. Pat. No. 7,991,637.

FIELD OF THE INVENTION

The present invention relates to sharing a group of objects, such as a calendar of events or a collection of images, between two or more users. Preferably, each user is able to access the group by means of a networked device, such as a laptop or other computer.

DESCRIPTION OF THE PRIOR ART

There are several available computer program applications that allow multiple users the facility of collaborative scheduling through sharing of calendars and the electronic sending of invitations. These include Lotus™, Exchange™, Meeting Maker™ and Outlook™. These known applications are designed, amongst other things, to allow users to view lists of attendees for meetings to which they are invited; to use e-mail to correspond with others; to send file attachments and respond to meeting and task requests; to schedule meetings and reserve locations and equipment; to share schedules with others in their workgroup; and to assign colleagues permission to read, modify or create items in their public or private folders.

As an example, in one known application a user may view the public calendars of all those he wishes to invite to a meeting in order to establish an appropriate time and place for the meeting. Based on this, the organiser may select a particular time and place for a meeting and invite various colleagues to the meeting. The invitees may accept or propose an alternative time and/or place. The organiser may then decide whether and how to reschedule the meeting and transmit his decision to the invitees. Accordingly, all control for scheduling of the meeting is held by the organiser and the invitees act as little more than passive respondents to information.

In another known application, a server holds data for the calendars of a plurality of users. Each user may have one or more calendars. The holder of a calendar or an administrator assigns access to the calendar to the desired other users. The access may allow the other users to read the calendar only or to effect changes to, or edit, the calendar. To gain access, a user must be networked to the server.

These well-known applications are heavily server-based and rely on particular calendar server software and communication protocols to allow users to share information on a network. A server will commonly store all information relating to all calendars in a particular format. Networked user devices must then access the server to obtain the required information. Any requests for changes to data must then be prepared in the correct format for successful transmission to the server. The server then effects the changes and stores the changed data for subsequent forwarding to other devices on the network when requested. In particular, the server will overwrite existing data. More specifically, the calendar will typically be stored by the server as a single file, which is then overwritten when the calendar is changed.

In addition, known applications are formulated to match the expected usage patterns of the targeted or intended users. This has the effect that they are heavily form-based and highly structured. In particular, they assign clearly delimited roles to each user. For example, one user will commonly be assigned the role of organiser for a meeting. It is incumbent on the organiser to schedule the meeting, send all invitations to attendees, collate the attendees' responses, reschedule the meeting if necessary and confirm the finalised meeting with the attendees. To perform these tasks, the organiser must insert the relevant information into a series of predetermined forms and follow a particular user procedure. Similarly, the invitees must respond to invitations by completing a predetermined response form.

Such systems are particularly rigid and will commonly require users to fulfil unfamiliar or incorrect roles. In particular, the form-based structure cannot be tailored to mirror the real-life interpersonal relationships between the users. Consequently, the assigned user roles are often awkward for the participants, involving too high or too low a degree of formality or requiring senior management to fulfil junior roles with respect to their staff. A further difficulty is that such form-based, highly structured applications are difficult to understand, unwieldy and unnecessarily complex for small- and medium-sized business organisations or for personal interactions.

BRIEF SUMMARY OF THE INVENTION

The present invention is made with a view to overcoming these difficulties. In particular, the present invention provides a method of sharing a calendar between a plurality of users, the calendar being capable of holding one or more events. The method comprises providing the calendar to each of said plurality of users; allowing any of said plurality of users to add to the calendar any of a new event, a change to an event and a message relating to an event; and providing any new event, change to an event or message added by a user to the other users. A change to an event may comprise a change to at least one of a start time of the event, an end time of the event, a description of the event, a status of the event, whether the event is to be repeated and the persons attending the event. At least one of an identification of a user who made a change, a time at which a change was made, a description of a change, a user comment relating to a change and an identification of the event before the change may be displayed for a selected event.

BRIEF DESCRIPTION OF THE DRAWINGS

Embodiments of the present invention will now be described by way of further example only and with reference to the accompanying drawings, in which:

FIG. 7 is a table showing the transfer of information between three computers according to the present invention;

FIG. 8 is another table showing the transfer of information between three computers according to the present invention;

FIG. 12 is another table showing the transfer of information between three computers according to the present invention;

DETAILED DESCRIPTION OF THE INVENTION

Figure 1:
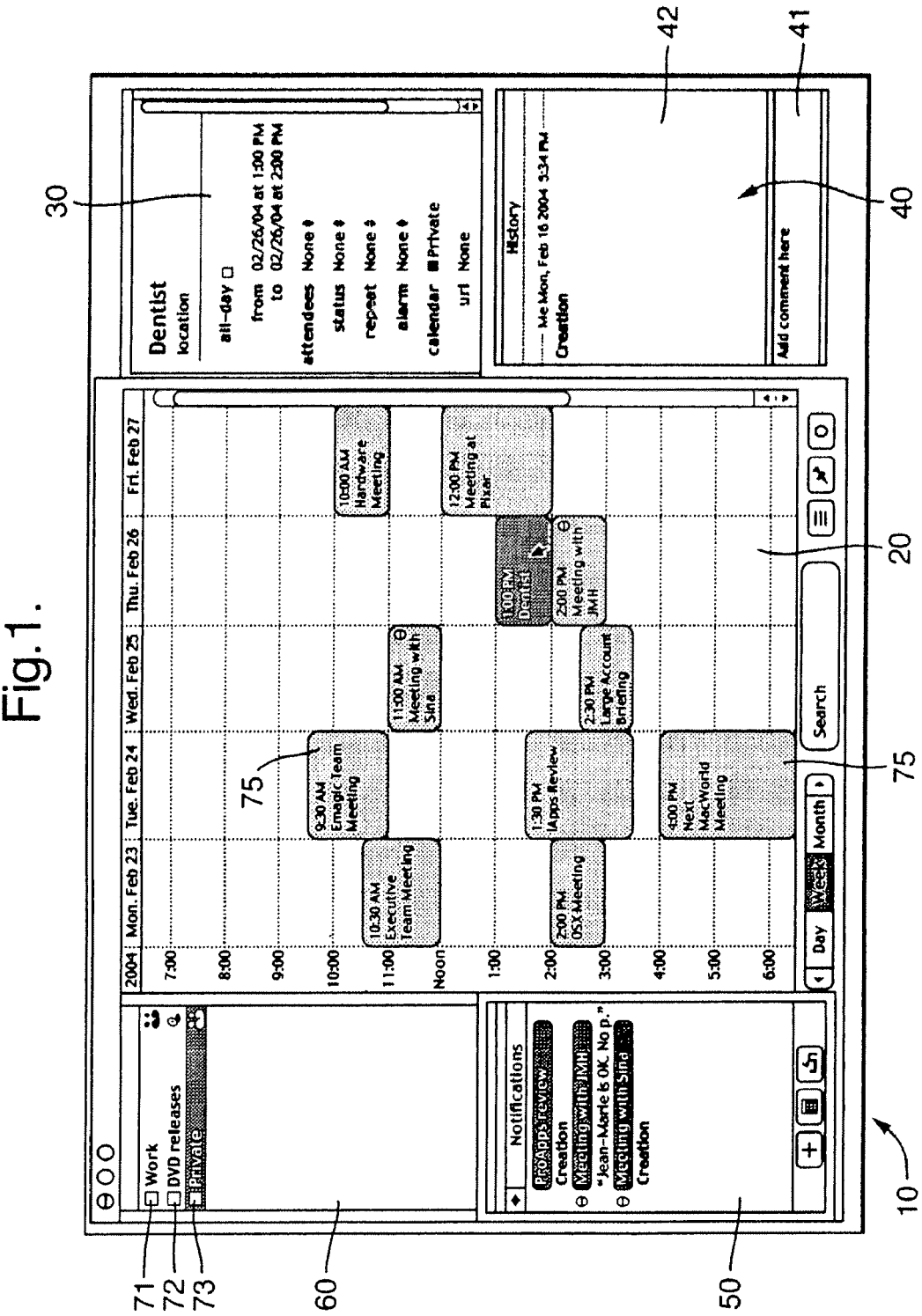
FIG. 1 is a view of a calendar user interface to which the present invention may be applied.

FIG. 1 is an illustration of a calendar user interface (UI) 10 to which the present invention may be applied. The UI 10 comprises a calendar main view 20, which displays events 75 over a selected time frame for one or more calendars. As shown by the calendar list 60, in the present example three calendars are displayed in the main view 10. These calendars are the user's work calendar 71, DVD release calendar 72 and private calendar 73. The private calendar 73 is shown in bold in the calendar list 60 and, correspondingly, events in the private calendar 73 are shown in bold in the calendar main view 20. The UI 10 further comprises an inspector window 30, which allows the parameters of a particular event in a calendar to be viewed. In the present example, the inspector 30 shows the scheduled time of a dentist appointment. Finally, the UI 10 includes a history window 40 and a notification window 50. These will be discussed in more detail below.

Figure 2:
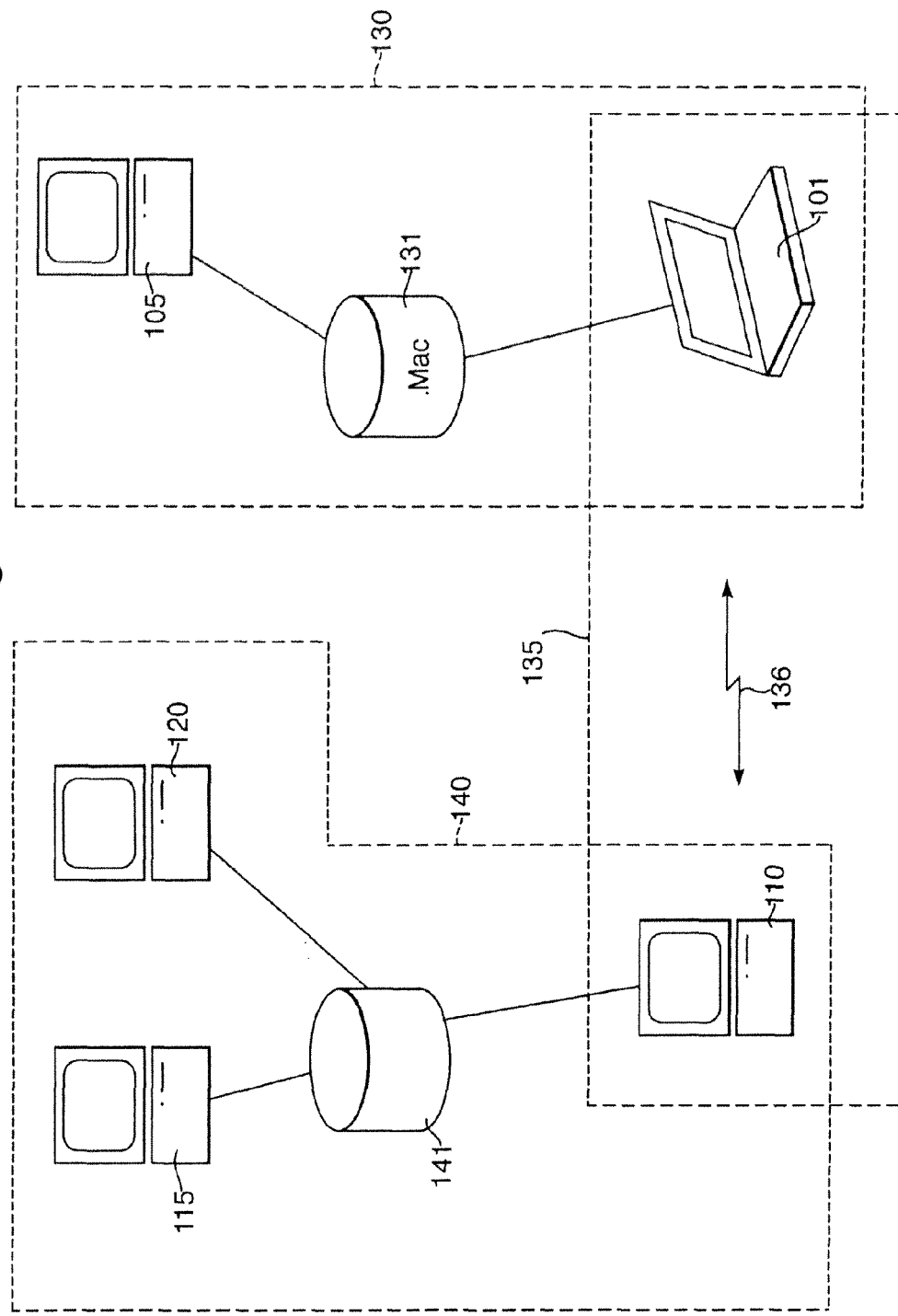
FIG. 2 is a schematic view of a network for sharing a calendar according to the present invention.

In a preferred embodiment of the present invention, each calendar may be shared by a plurality of users using one or more networks. FIG. 2 illustrates exemplary networks for sharing a calendar according to the present invention. In effect, FIG. 2 shows three interlinked networks 130, 135 and 140. The first network 130 comprises a laptop computer 101 and a desktop computer 105 networked over the Internet by means of a .Mac™ server 131. The second network comprises the laptop computer 101 networked to a second desktop computer 110 in a RendezVous™ network. A RendezVous™ network is a wireless network that eliminates the need to enter complicated Internet Protocol (IP) addresses or other information to set up devices on a network or locate people and other resources. Thus, when a "RendezVous™" device enters a RendezVous™ network, it is automatically detected and included in the network. Communications between devices in a RendezVous™ network are effected by wireless transmissions 136. The third network 140 comprises the second desktop computer 110, a local area network (LAN) server 141 and two further desktop computers 115 and 120 connected to the LAN server 141.

Each of the three user computers 101, 105 and 110 in the first and second networks may have a different user. For example, laptop 101 may have a first user, desktop 105 may have a second user and laptop 110 may have a third user. In this example, the second user is the wife of the first user and the third user is a work colleague of the first user. The first user has the three calendars shown in FIG. 1. As indicated by the "people" icons in the calendar list 60, the user shares his work and personal calendars with both the second and third users. That is, the second and third users are able to view the work and personal calendars of the first user at desktop computer 105 and desktop computer 110 respectively. Moreover, they are able to edit the work and personal calendars at their respective desktop computers 105 and 110 and to share the edited calendar with the other users.

For example, if the dentist were to contact the second user and change the time of the appointment to 12:00 PM, the second user would be able to view the first user's private calendar and edit the dentist appointment. Assuming both the first and second users are online, the change would then automatically be transmitted from the first desktop 105 to the laptop 101 by means of the .Mac™ server 131 and from the laptop 101 to the second desktop 110 by means of the RendezVous™ network. Accordingly, each user is able to view and edit any shared calendar and all changes are automatically transmitted to the other users.

In addition, the third user is also able to make changes to the first user's calendars and the changes are then shared with first user over the RendezVous™ network and subsequently with the second user by means of the .Mac™ server. Of course, further users may also be permitted to share and change the first user's calendars. For example, FIG. 2 further shows the second desktop computer 110 connected to a local area network (LAN) server 141, which is in turn connected to further desktop computers 115 and 120. Thus, the users of the further desktop computers 115 and 120 are able to view and edit the same calendar by means of interconnections with the second desktop computer 110 via the LAN server 141. Yet further users may access the shared calendars by means of the .Mac™ server 131, the RendezVous™ network 135 or yet another server. Indeed, the first laptop 101 may also be connected to the LAN server 141.

Accordingly, the possible sources of change to a single event in the user's calendar stored on the first laptop 101 include a change from the .Mac™ server 101, a change from the RendezVous™ network 135, a change from another generic server such as LAN server 140, a local change made by the user on the laptop, and a synchronisation operation occurring when a user synchronises the data on his devices, such as another laptop computer (not shown), a PDA (not shown) or a mobile phone (not shown). In addition, an invitation sent by another user may create an event.

Moreover, changes to a calendar may be effected when some or all the relevant users are offline. As the users go online, the change is disseminated through the networks until all users sharing the calendar are correctly updated. Thus, there are many possible sources of change to events in each calendar and these changes can be made asynchronously—that is, changes may be made offline and without knowledge of other changes.

To avoid the above-mentioned problems of form-based calendar-sharing applications, the present invention provides a sharing procedure that does not attempt to match expected usage patterns. Instead, the present invention provides a sharing convention in which all sharers of a calendar may be permitted to add an event to the calendar, to effect a change to an event or to add a comment either to an event or to a change to an event. The present invention then displays to the other users the change to the event and any comment that the changer may have appended to the change. In other words, when a user effects a change to a calendar, the change is automatically displayed to the other users. In addition, the user is also able to append a message explaining the change to the other users and the message will also be automatically displayed to the other users. Alternatively, he need not send the simultaneous message or he may send a message without changing the calendar. In each case, the message may be integrally associated with, or form part, of the event.

Consequently, users are able to develop and adopt their own conventions for interacting with one another, which will mirror their real-life interpersonal relationships. These conventions can develop organically. For example, if a calendar is "owned" by the CEO of a company and the group of users sharing the calendar includes several senior managers and several junior staff, the group may adopt a convention in which only the CEO and the senior managers change the times of events scheduled in the calendar, but the junior staff append messages to an event requesting a change in time. In addition, the messages appended by each user can adopt the appropriate level of formality. For example, some users may refer to each other by their initials, others by their first names and others by their titles (Mrs, Miss, Mr etc).

Conversely, if the group of users includes colleagues of a similar level of seniority in an organisation, then the tone of the messages and the accepted permissions to alter events are likely to be more informal. Similarly, if the group of users is a group of friends; the group comprises the members of a band or team; or the group of users is a family, the convention adopted by the group is likely to be more informal still. Consequently, the convention adopted by a group for sharing a calendar is able to adapt organically and users are able to assign themselves roles that match exactly their interpersonal relationships with other members of the group. Thus, communication between the users in a group closely mirrors real life and is more natural.

In one embodiment of the present invention, a history of each event is displayed to each user viewing the calendar. Accordingly, the UI 10 in FIG. 1 is provided with the history window 40, which comprises a history box 42 and comment box 41. The history and comment boxes 41 and 42 are shown in more detail in FIG. 9.

Figure 9:
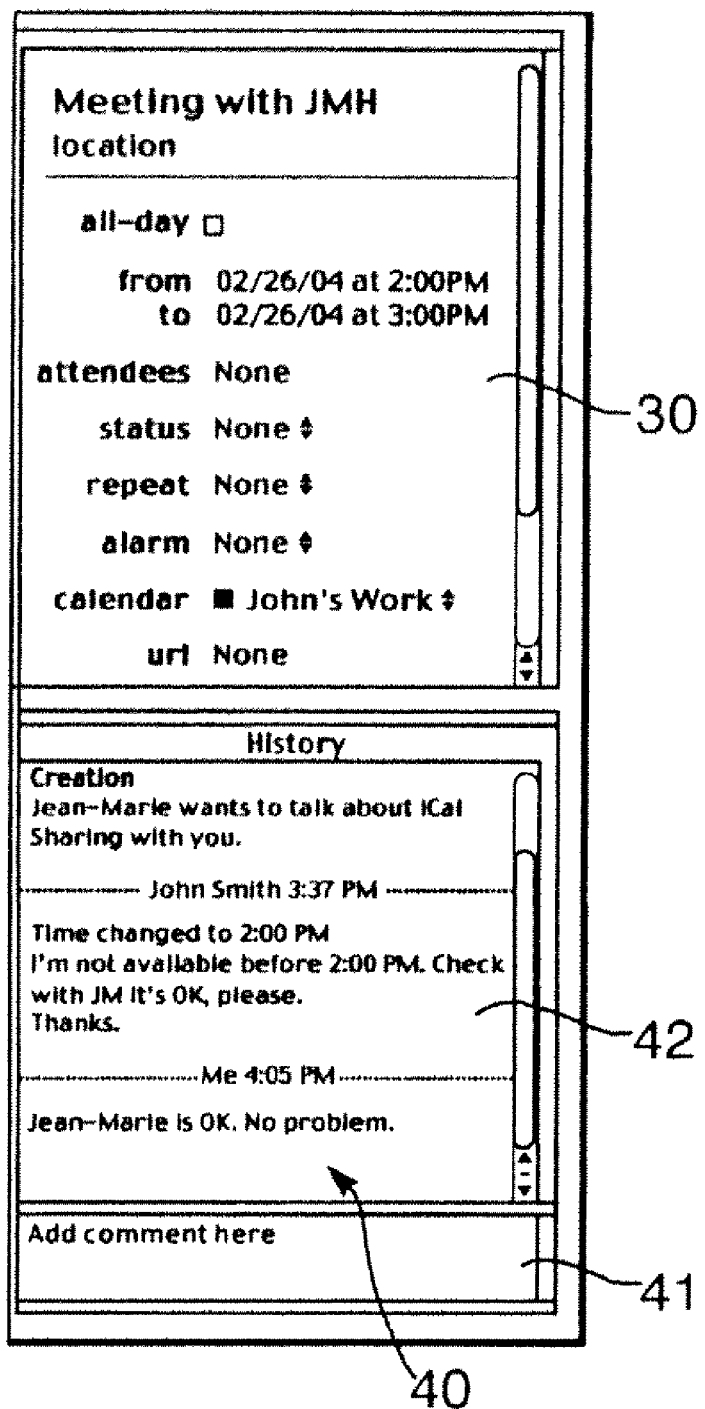
FIG. 9 is a view of an inspector box and a history box in a calendar user interface according to the present invention.

In particular, if a user clicks on the meeting with JMH at 2:00 PM on Thu, 26 February in the calendar main view 20 in FIG. 1, the inspector window 30 and the history window 40 shown in FIG. 9 are displayed by the calendar UI 10.

More specifically, FIG. 9 shows an enlarged view of the inspector window 30, which allows the parameters of a particular event in a calendar to be viewed, and the history window 40 of a UI 10 equivalent to that shown in FIG. 1. The inspector window 30 shows the most up-to-date information for the event. In particular, the inspector window 30 shows that the event entitled "Meeting with JMH" is scheduled to start at 2:00 PM on Feb. 26, 2004 and to end at 3:00 PM the same day. The event is included in John's calendar, there are no attendees, there is no status, the event is not repeated and no alarms are set.

In contrast, the history window 40 shows all the changes that have been made to the event. In this example, the calendar belongs to John (Smith) and a meeting for between 1:30 PM and 3:00 PM was created as an event by his assistant Clara at 3:23 PM. The history window in FIG. 9 is the window shown to a user logged on to the computer as Clara. Accordingly, the history window shows that the event was created with the comment that "Jean-Marie wants to talk about iCal Sharing with you". Since Clara created the event, the history window does not show her, as the user, the time or creator of the event. However, other embodiments of the present invention may do so.

The history window 40 in FIG. 9 also shows that John Smith changed the event at 3:37 PM. In particular, he changed the start time of the event to 2:00 PM and added the comment "I'm not available before 2:00 PM. Check with JM if it's OK, please. Thanks." Viewing the full screen shot of the UI 10 in FIG. 1, it is clear that the time of the JMH meeting was changed due to a dentist appointment between 1:00 PM and 2:00 PM. The dentist event could have been added after the JMH meeting event was created; Clara might not have had sharing access to the personal calendar in which the dentist appointment event is held; or Clara might have omitted to check the private calendar before creating the JMH meeting event.

Finally, the history window shows that after checking that the change was acceptable to Jean-Marie, Clara has simply added a message to the event that "Jean-Marie is OK. No problem." Although no change to the event itself was made, the preferred embodiment of the present invention allows such comments to be included in the history, together with the time of creation and the creator of the comment. This comment was transmitted to all computers that share John Smith's calendar.

Of course, the calendar main view 20 in the UI 10 will also show the most up-to-date details for the event, but in the context of a day/date array. In particular, the main view 20 in FIG. 1 shows the meeting with JMH on Thu, February 26 at 2:00 PM after the dentist appointment. Although, the calendar main view 20 shown in FIG. 1 shows a five-day view in day-based linear layout, the number of days in the view can be changed. Alternatively, a grid layout may be used. In this example, all the events in the main view are shown as opaque, with the dentist appointment in the private calendar being shown in a darker colour than the appointments in the work calendar.

Figure 10A:
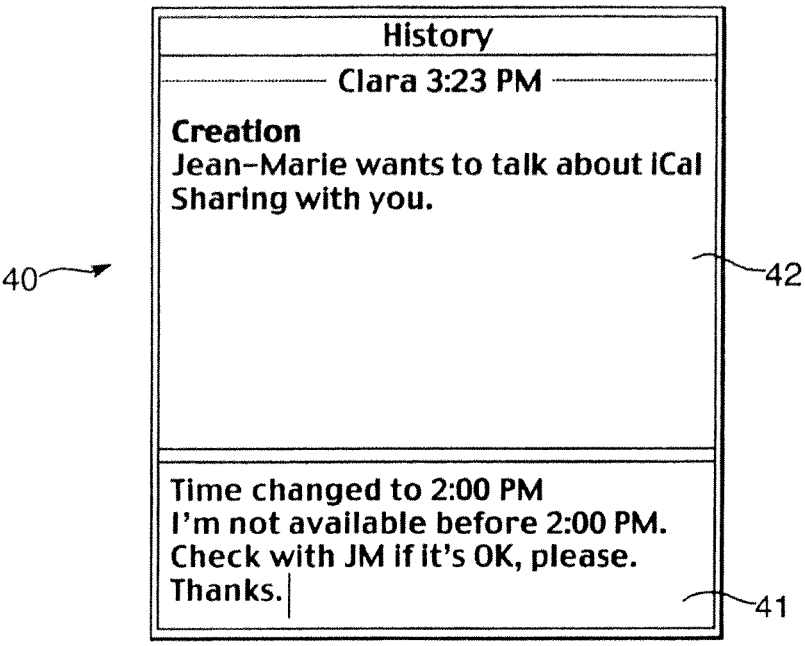
FIGS. 10A and B show changes to a history box in a calendar user interface according to the present invention.
Figure 10B:
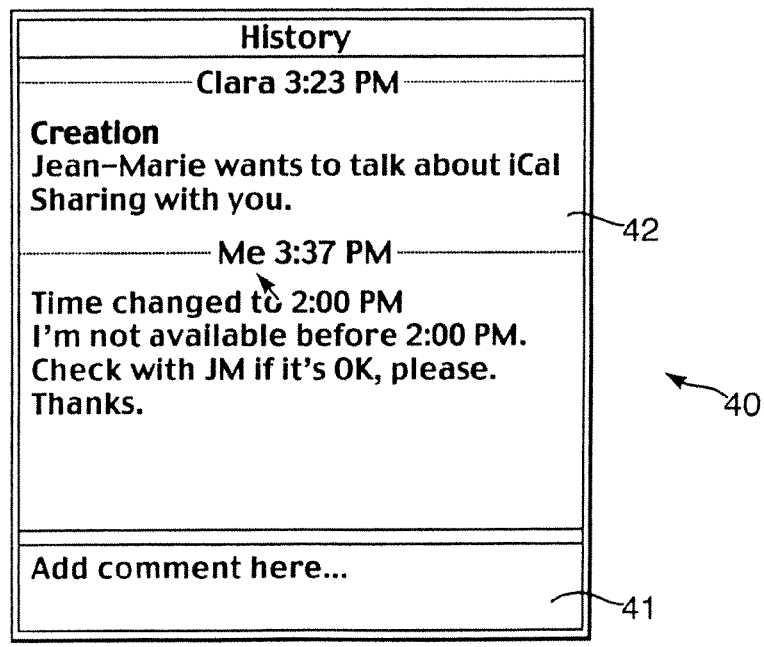

Further examples of history windows are shown in FIGS. 10A and B. In particular, FIGS. 10A and B show how the history window 40 viewed by John Smith changes in the above example. Specifically, in the window shown in FIG. 10A, John Smith is able to see that Clara has booked the appointment. He then changes the appointment to start at 2:00 PM and adds the comment "I'm not available before 2:00 PM. Check with JM if it's OK, please. Thanks." in the comment box 41 at the bottom. At this stage, the change is local and is not sent to other calendar-sharing computers. As soon as John Smith confirms the modification to the appointment, the history data of the new event is added in the history box 42 in the history window 40. Thus, in FIG. 10B as the registered user John Smith is able to see in the history box 42 that "Me" (that is, he himself) changed the event at 3.37 PM, how he changed it and the comment that he appended. The comment box 41 is now clear.

It is clear in this example that, although their relationship is comparatively informal, Clara holds a subordinate role to John Smith. However, the form-based, highly structured prior art applications would not be able to reflect this and would most likely cause Clara, as the creator of the event in the calendar, to assume the role of a superior to John Smith and to interact with him in a highly formal manner. In contrast, in the present invention the communication convention adopted by Clara and John Smith closely mirrors their day-to-day working relationship, with precisely the level of formality that the participants are comfortable with.

Figure 11:
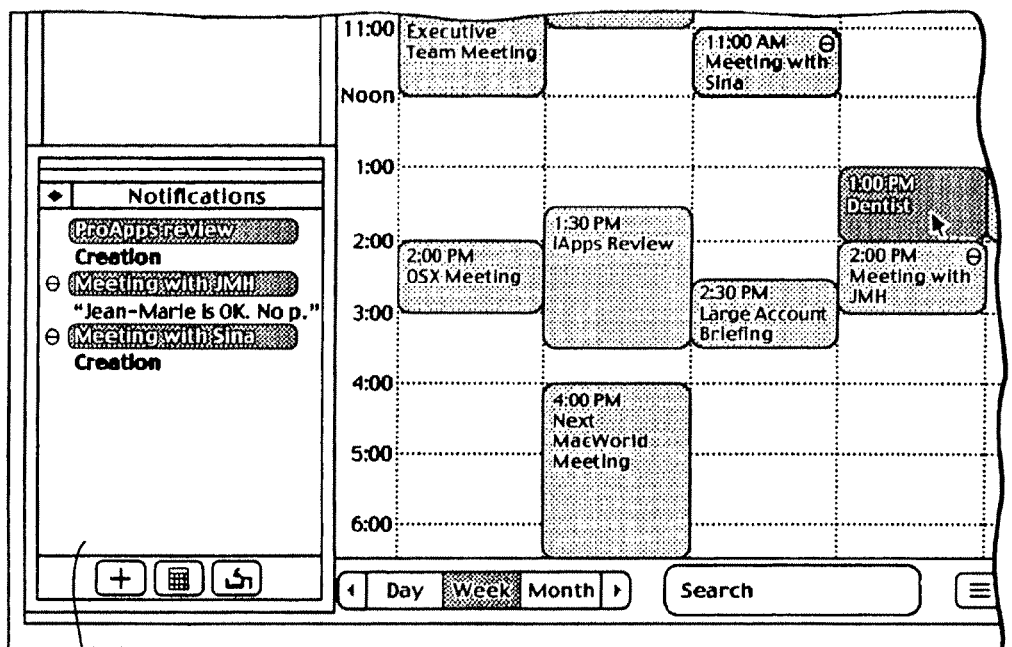
FIG. 11 is a view of a notification box in a calendar user interface according to the present invention.

Another embodiment of the present invention provides a notification to users when an event has been changed by another user. In particular, as soon as a user's computer receives an alteration to an event (or a new event), it displays an indication of this in the notification window 50 shown in FIG. 1. An enlarged view of this window is shown in FIG. 11.

More specifically, as soon as the computer receives a change to an event it notifies the user of the change. In the example shown in FIG. 11, the calendar-sharing program displays in the notification window 50 the title of the event and either the change that was made to the event or the comment appended to the changed event. Thus, the user is able to see that the events "Pro Apps Review" and "Meeting with Sina" have recently been created and the event "Meeting with JMH" has recently been modified. The bullet point to the left of each title indicates whether the user has already taken into account the modification. Optionally, the user may set the computer to provide other forms of notification, including audible alarms or alternative screen displays.

Of course, the notification window 50 may use a combination of any of the details of the event, including the timing of the event and the type of change to the event, in the display.

In a further embodiment of the present invention, a notifications filter may be provided. This allows the user to select the events or calendars for which he requires notifications of a change (or for which he does not require notifications of a change). For example, imagine that an office administrator holds a separate calendar for each of ten meeting rooms available in an office. He shares those calendars with all members of staff, who are able to book time slots by creating an event in the appropriate calendar at the appropriate time. However, most members of staff will not require to be notified each time another employee books a time-slot in a meeting room and thereby creates a change in the calendar. The notification filter can be provided to filter out all notifications to a user of changes to the meeting room calendars unless he requests them. However, if a user has booked a time-slot on a meeting room calendar (and therefore created an event), he can set the notification filter to notify him only of modifications to that event—that is, only when a new version of that time-slot is received by the user's computer.

In one embodiment, to achieve this functionality the present invention considers each calendar as a collection of objects, each object being an event. The event comprises parameter data relating to the event. For example, the parameter data may comprise the start and end times of the event. These times will include the date of the event. The parameter data may also include a description of the event (for example, "dentist"), a status of the event (for example, "very important"), how many attendees there will be at the event and whether the event is to be repeated. In addition, the parameter data may include an indication of whether an alarm is to be sounded and, if so, how long before the event is due to start the alarm should be sounded.

Unlike the prior art, in which each calendar is stored as a single file, the present invention stores each calendar (or collection of objects) in a folder. When a new event such as a dentist appointment is created, the event is transmitted to all permitted sharers of the calendar. When the event is transmitted, all parameter data of the event are sent.

When a user makes a change to the event on his computer, a new version of the event is created and stored. The new version includes all the same categories of parameter data as the original event. However, some of this parameter data will have been changed. For example, FIG. 1 shows a dentist appointment between 1:00 PM and 2:00 PM. If the time of the appointment is changed so it is between 12:00 PM and 1:00 PM, the start time and end time parameter data will be changed in the new version but the remaining parameter data will be unchanged. When the user confirms the change, the new version with the new start and end time parameter data will be transmitted to all permitted sharers.

Figure 3A:
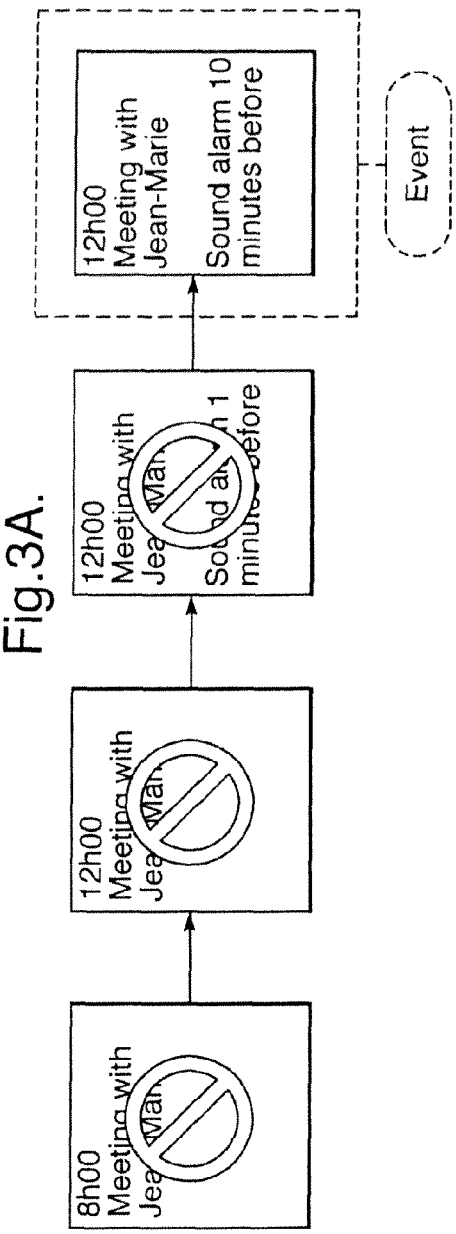
FIG. 3A is an illustration of a series of changes to an event according to the prior art.

In the prior art, each previous version of the event is replaced or overwritten in the computer by the new version. This is illustrated in FIG. 3A, which shows that an event comprising a meeting at 8:00 AM with Jean Marie was initially created. This was subsequently changed to, and overwritten by, consecutively the same meeting at 12:00 PM; the same meeting at 12:00 PM with an alarm 1 minute before; and the same meeting at 12:00 PM with an alarm 10 minutes before. This last change forms the event and is sent in a format appropriate to the communication protocol required for communication between the computers used to share the calendar.

Figure 3B:
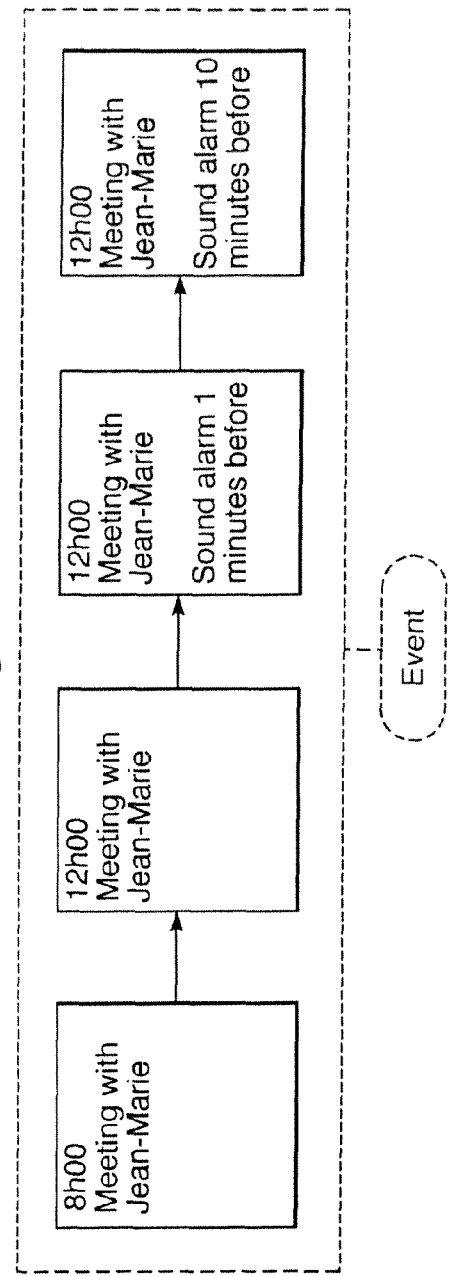
FIG. 3B is an illustration of a series of changes to an event according to the present invention.

However, as shown by FIG. 3B, in the present invention all versions of the event are retained by each computer on which the calendar is shared. Thus, the computer uses all versions of the event to establish how the event should be treated. To allow the computers used to share the calendar to distinguish between different versions of an event, the computer on which the change is made further provides the new version with additional data that relates to the change of the event. This additional data may be termed metadata and preferably includes the time at which the change was made or the new version created. The metadata preferably also includes an identification of the previous version of the event from which the current version was created, an identification of the user who made the change, a description of the change and a user comment relating to the change.

Effectively then, an event comprises a set of versions. Each version comprises at least some metadata that will be useful to the computers used to share the calendar, in particular to deduce how to treat the different versions of the event and how to display the event. However, there is no requirement for the versions to be ordered. Thus, the communication protocol used to share the calendar between computers can be metadata agnostic. This has the significant advantage that the calendar data need not be stored in any specific format and no specific calendar server software need be provided. Instead, any server software that is capable of storing different versions of the same object can be used to communicate data between calendar-sharing computers. Alternatively, computers are able to share calendar data peer-to-peer, without the intervention of a server at all.

Figure 4:
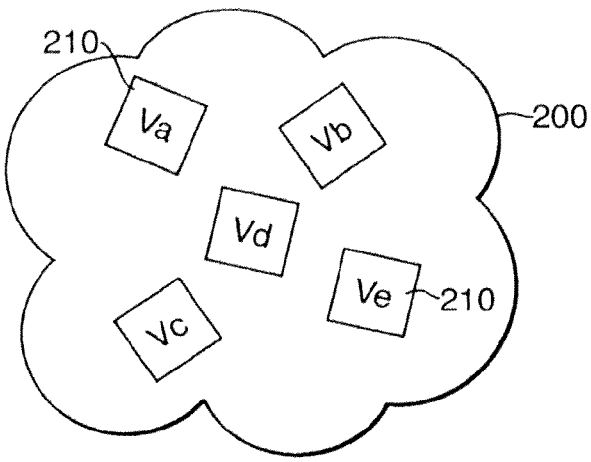
FIG. 4 is an illustration of an object according to the present invention.

FIG. 4 shows how an event 200 can be conceived as a sack of unordered versions 210. Specifically, Va, Vb, Vc, Vd and Ve are simply different versions of event V and are stored entirely unordered in the communication protocol. In addition, each version will include additional metadata. For example, assume the metadata is a list of the previous versions already present in the event 200 when a new version is created. In addition, suppose that the notation Va (Vc, Vd) signifies that when Va was created, Vc and Vd were already present in the event 200. With the following information:

Vb (Ve, Va, Vc, Vd)
Ve (Va, Vc, Vd)
Va (Vc, Vd)
Vc (Vd)
Vd 0 the computer is able to establish an ordered list of versions, as follows:

Vd→Vc→Va→Ve→Vb with Vb being the most recent state of the event. In particular, the latest version Vb can be displayed as the current state of the event to a user. As noted above, the communication protocol for sharing information between calendar-sharing computers pays no attention to the metadata contained in the different versions. This information is used effectively only by the calendar-sharing software provided on each calendar-sharing computer. From the point of view of the sharing protocol, a version is simply a version that is associated with a unique identifier. In the example above, the unique identifiers are a, b, c, d and e. When a new version is received by a calendar-sharing computer, it is simply added to the relevant event, with exactly the same status as the other existing versions for this event. So far as the communication protocol is concerned, the task concerning the new version has been completed. However, the calendar-sharing software provided on the receiving computer must use the metadata associated with the new version to establish how to treat it in relation to the other versions.

Figure 5A:
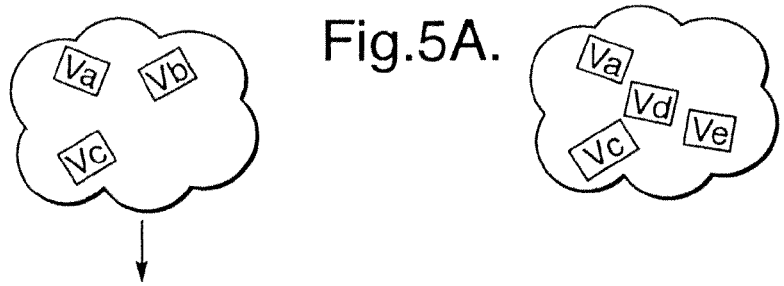
FIGS. 5A to C are illustrations of the synchronisation of an event between different calendar-sharing devices.
Figure 5B:
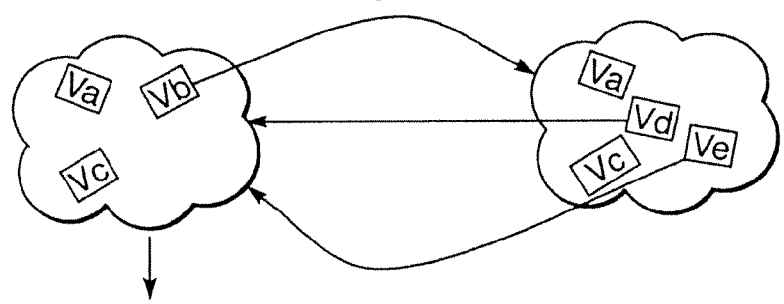
Figure 5C:
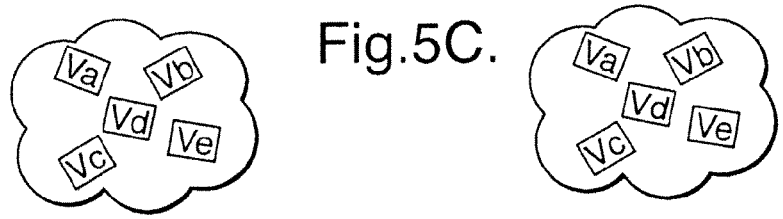

When an event needs to be synchronised between different calendar-sharing computers, or between a calendar-sharing computer and a server, the two devices compare what versions they hold for each event, as shown in FIG. 5A. They then transmit to one another the versions that they do not have in common, as shown in FIG. 5B, no that both devices have all the same versions, as shown in FIG. 5C. Where the device is a calendar-sharing computer, its calendar-sharing software will use the metadata to establish how to treat the event. Thus, where two calendar-sharing computers store the same versions of an event, they will treat that event the same. Where one of the devices is a server, it will simply act as a passive repository of data and store all versions without regard to the metadata.

In the foregoing example, the metadata signifies what versions of an event already existed when a new version was created. However, where one or more of the versions were created offline, this may not be sufficient data for a calendar-sharing computer to create an ordered list of versions. To overcome this problem, the metadata may instead or additionally include a time stamp indicating when the event was changed and the version created.

Figure 6:
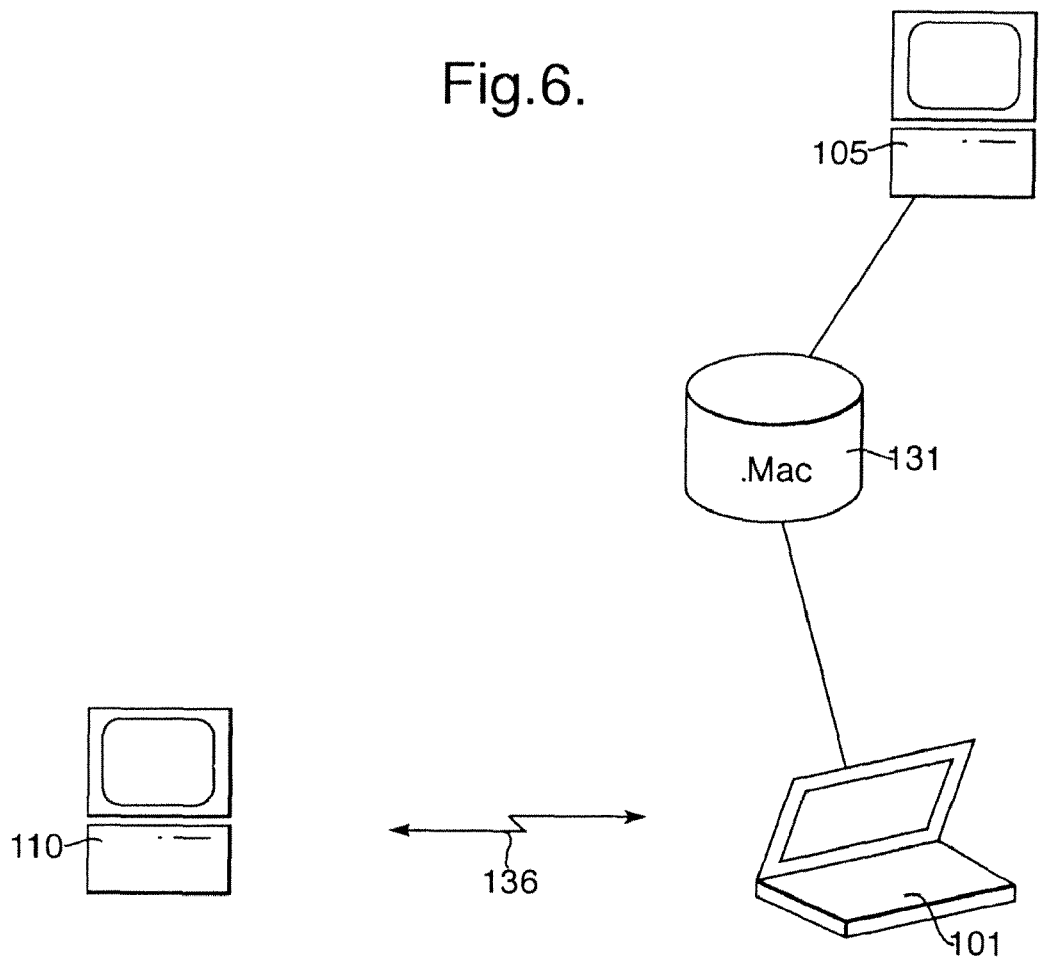
FIG. 6 is a schematic view of another network for sharing a calendar according to the present invention.

FIG. 6 shows another example of a network in which the present invention may be used. The network shown in FIG. 6 is similar to the network shown in FIG. 2 and like components have like reference numbers. However, the network shown in FIG. 6 does not include the third sub-network 140. Hence, LAN server 141 and additional desktop computers 115 and 120 are omitted. Again, a first user uses the laptop 106, which communicates with the second user's desktop 105 by means of the .Mac™ server 131 and with the third user's desktop 110 by means of the RendezVous™ network 135.

In step 1 of FIG. 7, the first user creates the first version $V_0$ of an event V. When the first user commits to creating that event, the created (or first) version $V_0$ is transmitted to .Mac™ server 131 and, when the second user goes online, from .Mac™ server 131 to the second user's desktop 105. At the same time, when the third user's desktop 110 and the first user's laptop 101 are networked, version $V_0$ is received by the third user's laptop 110. Accordingly, all three computers hold version $V_0$. This is shown in step 2 of FIG. 7. All users then go offline.

In step 3, the second user changes the event and creates version $V_1$. Since none of the users is online, only the second user's desktop 105 holds the new version $V_1$. When the second user goes online, version $V_1$ is uploaded to the .Mac™ server 131, but will not be sent to the first user's laptop 101 until he goes online by connecting to the .Mac™ server 131. When he does so, the new version is sent to laptop 101, as shown at step 4. However, at this stage there is no Rendez-Vous™ network connection between laptop 101 and desktop 110 and desktop 110 therefore still does not hold version $V_1$.

In step 5, while still offline, the third user changes the original event independently of the change already made by the second user, thereby creating version $V_1'$. When the third user goes online by forming a wireless network connection between desktop 110 and laptop 101, the two computers compare the versions of the event that they hold respectively. This results in the new version $V_1'$ being sent to the laptop 101 and the previous version $V_1$ being sent to the desktop 110. Similarly, when the laptop 101 connects to the .Mac™ server 131 they compare the versions of the event that they hold and the new version $V_1'$ is sent to the .Mac™ server 131. Finally, when the second user goes online the desktop 105 receives the new version $V_1'$ from the .Mac™ server 131. Thus, as shown in step 6 all computers eventually hold all versions of the event, although they are received in a different order.

As illustrated in step 7, the calendar-sharing software on each computer uses the metadata for each version to determine how to deal with the different versions of the event. In this example, the metadata of each version includes a time stamp of when the version was created. Since it was created before version $V_1'$, the software on the third user's desktop 110 uses this data to "insert" version $V_1$ between versions $V_0$ and $V_1'$ and determine how and what data is displayed for the event accordingly.

Another example is shown in FIG. 8. In step 1, the first user again creates the first version $W_0$ of an event W. When the first user commits to creating that event, the created (or first) version $W_0$ is transmitted to .Mac™ server 131 and, when the second user goes online, from .Mac™ server 131 to the second user's desktop 105. At the same time, when the third user's desktop 110 and the first user's laptop 101 are networked, version $W_0$ is received by the third user's desktop 110. Accordingly, all three computers hold version $W_0$. This is shown in step 2 of FIG. 8. All users then go offline.

In step 3, the second user changes the event and creates version $W_1$. Since none of the users is online, only the second user's desktop 105 holds the new version $W_1$. When the second user goes online, version $W_1$ is uploaded to the .Mac™ server 131, but will not be sent to the first user's laptop 101 until he goes online by connecting to the .Mac™ server 131.

Before he does so, the third user changes the original version $W_0$ of the event independently of the change already made by the second user, thereby creating $W_1'$ (step 4). At this stage, the desktops 105, 110 are unaware of the new version the other has created and the first user's laptop 101 is unaware of either of the new versions.

When the third user's desktop 110 forms a wireless network connection with laptop 101, the two computers compare the respective versions of the event that they hold. This results in the new version $W_1'$ being sent to the laptop 101, as shown at step 5. However, at this stage there is no network connection between laptop 101 and desktop 105 and desktop 105 therefore still does not hold version $W_1'$.

In step 6, the laptop 101 connects to the .Mac™ server 131 and they compare the versions of the event that they hold. Thus, version $W_1'$ is sent to the .Mac™ server 131. Finally, when the second user goes online the desktop 105 receives the new version $W_1'$ from the .Mac™ server 131. In addition, the .Mac™ server has received the previous version $W_1$ from the desktop 105 and sends it to the laptop 101. Thus, as shown in step 6, all computers eventually hold all versions of the event.

As illustrated in step 7, the calendar-sharing software on each computer uses the metadata for each version to determine how to deal with the different versions of the event. In this example, the metadata of each version again includes a time stamp of when the version was created. Since it was created before version $W_1'$, the software on the third user's desktop 110 uses this data to "insert" version $W_1$ between versions $W_0$ and $W_1'$ and determine how and what data is displayed for the event accordingly. Similarly, the software on the second user's desktop 110 uses this data to "tack on" version $W_1'$ after versions $W_0$ and $W_1$, so that the same data is displayed in the same way for the event. Consequently, irrespective of the order in which the computers go online and communicate with one another, the software on each computer effects the display of the same data for each event to each user.

The metadata can be useful not only for presenting changes to users in the correct order. As discussed above, in a preferred embodiment of the present invention the metadata also includes an indication of the user who made the change, the time at which the change was made, a description of the change and an optional comment added by the user who made the change. This metadata is then displayed to each user in the form of a history of the event.

Returning to FIG. 9, the inspector window 30 shows the most up-to-date parameter data for the event—that is, the parameter data of the most recently created version of the event. In particular, the inspector window 30 shows that an event entitled "Meeting with JMH" is scheduled to start at 2:00 PM on Feb. 26, 2004 and to end at 3:00 PM the same day.

In contrast, the history window 40 shows the metadata for all versions of the event. Accordingly, the history window shows the metadata that the event was created with the comment that "Jean-Marie wants to talk about iCal Sharing with you". Since Clara created the event and she is logged on as the user, the history window does not show her metadata relating to the time or creator of the event. However, other embodiments of the present invention may do so.

The history window in FIG. 9 also shows the metadata that at 3:37 PM John Smith changed the start time of the event to 2:00 PM and added the comment "I'm not available before 2:00 PM. Check with JM if it's OK, please. Thanks."

Finally, the history window shows the metadata of the message added to the event that "Jean-Marie is OK. No problem." Although no change to the parameter data was made, a new version of the event was created with the metadata that the new version was created by Clara, the time of creation and the additional comment. This new version was transmitted to all computers that share John Smith's calendar.

Similarly, the metadata is used in FIGS. 10A and B to show the event history.

A further advantage of the client-based data structure discussed above is that it allows notification to users to be easily performed. In particular, as soon as a user's computer receives a new version of an event (or the first version of an event), it displays an indication of this in the notification window 50 shown in FIG. 1. More specifically, as soon as the computer receives a new version of an event it can use the metadata to provide the user with the notification of the change. In the example shown in FIG. 11, the calendar-sharing program uses the metadata and the parameter data to display in the notification window 50 the title of the event and either the change that was made to the event or the comment appended to the changed event.

Of course, the notification window 50 may use a combination of any of the parameter data and metadata in the display.

It will be clear from the foregoing description that the calendar-sharing data protocol discussed above is essentially an "add only" protocol. In other words, all versions of an event are retained and none are deleted or destroyed during normal operation. This has the significant benefit that no dedicated calendar server software is required. Instead, all the "intelligence" is held by the computer programmed with the calendar-sharing software and the server, if used, merely acts as an "unintelligent" repository of the calendar data. More specifically, the computer programmed with the calendar-sharing software provides the intelligence to add metadata to each new version of an event and the intelligence to interpret a plurality of different versions of the same event and to display them meaningfully to the user. When a new version arrives in the computer programmed with the calendar-sharing software, it is simply added to the event, with exactly the same status as the other versions of the event. From the point of view of the sharing protocol, the task concerning the new version is completed. Of course the calendar-sharing software must then interpret the metadata to determine how the event should be displayed.

Moreover, the protocol is very versatile and highly adaptable. In particular, the protocol allows changes to an event in a calendar to be made using the local device on which the calendar is held, a .Mac™ server, a RendezVous™ network and any other suitable versioning server (such as a DeltaV server acting for a LAN). By a versioning server is meant any server that is capable of storing several versions of the same object. Generally, versioning servers store the different versions of an object in a particular order. However, in the present invention the different versions can be stored in any order, like a sack of potatoes. Direct data transfer between computers and other devices, for example by physical wiring, telephone interconnection, Bluetooth and other IR communication, are also possible.

As noted above, the sharing protocol discussed above involves an "add only" rule. Accordingly, events are not deleted in the present invention. Rather, when a user wishes to delete an event, a new version of that event is created, the new version being marked "deleted". One example of how a deletion may be handled by the present invention is shown in FIG. 12.

Similar to FIGS. 7 and 8, user 1 creates an event $X_{00}$ (step 1) and sends it to users 2 and 3 (step 2). For the purposes of illustration, each user displays the event as rectangle in FIG. 12. In step 3, user 2 decides to delete the event. Accordingly, a new version of the event $X_x$ is created and user 2 no longer displays a rectangle.

In step 4, users 1 and 3 receive the new version $X_x$. Since they are not the creators of new version $X_x$, they display the event in a format indicating that it has been deleted. In FIG. 12, users 1 and 3 display the event as a rectangle with a cross through it. However, in the calendar main window 20, the "deleted" event could be shown in a number of ways. For example, it could be shown in red or another colour, or as translucent, or as a combination. Other suitable forms of display will be apparent to those skilled in the art.

Users 1 and 3 then have three options to decide how to treat the deletion by user 2. First, they can simply ignore the deletion and no further steps are taken. Second, they can choose to accept the deletion. Thus, step 5 shows that user 3 has accepted the deletion and no longer displays the rectangle. Effectively, the computer has been instructed to treat version $X_x$ by no longer displaying the event. Analogously, user 3's calendar main window 20 may no longer show the event. Note that users 2 and 3 still retain versions $X_{00}$ and $X_x$ but simply do not display them.

The third option is to reinstate the event. This is shown in step 6, in which user 1 has copied all the parameter data of version $X_{00}$ to create version $X_{01}$. However, version $X_{01}$ will have its own metadata, indicating who made the change, when and how. In step 7, the most recent version, $X_{01}$, is transmitted to users 2 and 3, which subsequently display the event.

In one embodiment, to save space or permanently prevent an event from being viewed, only the owner of the calendar may cause the event to be physically deleted. This option cannot be undone and involves removing all versions of the event and replacing the event everywhere with a token indicating that the event is now deleted and read-only. This is particularly important where a server is used to share the calendar data.

In addition, in a preferred embodiment users are able to move events from one calendar to another. Preferably, this entails copying an event in a first calendar, marking the event deleted in the first calendar and pasting the copied event to create a new event in a second calendar. The step of copying may involve copying all versions of the event, including the metadata for each version. In that case, the history of the event will be recoverable in the new calendar. Alternatively, only the most recently created version and its metadata need be copied. A further alternative is to copy only the parameter data but not the metadata of the most recently created version. In that case, no history will be retained for the event in the second calendar. Of course, a new history will be created as the event is changed in the second calendar. It will be apparent to persons skilled in the art that other options are possible when moving events between calendars.

In a preferred embodiment, duplication, cut, copy and paste operations within a calendar may also be performed. These steps are similar to the move operation described above. In particular, a cut and paste operation will involve copying the event (and at the user's option all versions of the event so the history is retained), marking the original event as deleted so it is no longer displayed, and pasting the event at a different location.

Since the sharing protocol involves an "add only" rule, there is no way to "undo" a change in the traditional sense. To undo a change, a user may select one of the previous versions of the event. The parameter data of that version are then copied to form a new version with new metadata. Of course, the original version and all intervening versions are maintained. Thus, the metadata may cause the history box to display the creation of the new event as an undo.

Imagine for example that an event Y is created (version 0) with the parameter data (a) and this is changed to version 1 with parameter data (b). A series of changes could be represented as:

$Y_0(a) \rightarrow Y_1(b) \rightarrow Y_2(c) \rightarrow Y_3(d) Y_4(b)$.

In this case, after version $Y_3$ the user wished to undo the last two changes and revert to the event parameters of version 1. Accordingly, the parameter data (b) of version 1 was copied to form version 4. However, version 4 will have its own metadata and versions 1, 2 and 3 are maintained. Thus, the history box can show all the changes.

Users may also be allowed to schedule recurring events, such as a weekly meeting. However, as noted above, when a server is used to share calendars in the present invention, the server effectively acts as a passive repository of data. Recurring events are therefore treated as single objects involving a recurrence rule. The recurrence rule might involve, for example, setting the start and end dates of a recurring event and the frequency of the recurrence (daily, weekly, monthly, yearly etc).

Thus, when a recurrence rule changes, the individual events or occurrences are not modified separately. Rather, the whole set of recurring events is changed. However, a change to a recurrence rule may have the effect of modifying a single, specific occurrence in the set of recurrences. When a single, specific occurrence in the set of recurrences is changed, that occurrence may be considered as a detached occurrence.

Accordingly, in a preferred embodiment of the present invention the history of individual occurrences resulting from a recurrence rule comprises two parts. The first part displays the changes made to the specific selected occurrence or to all occurrences that do not involve a change to the recurrence rule itself. The second part displays the changes to the recurrence rule itself, for example any changes to the start date or end date of the recurrence rule.

Returning to FIG. 1, the UI 10 displays the three calendars held by a single user. In example, this user can be called John Smith and can be logged on to a device such as a computer that is, or is capable of being, connected to one or more other devices in a network. Moreover, in this example, John Smith shares his work and private calendars 71, 73 over the network with a group of other users but not his DVD releases calendar 72. This is indicated by the group icon positioned to the right of the work and private calendar headings 71, 73 in the calendar list. Moreover, in this example John Smith does not share any calendars owned by other users.

Figure 13:
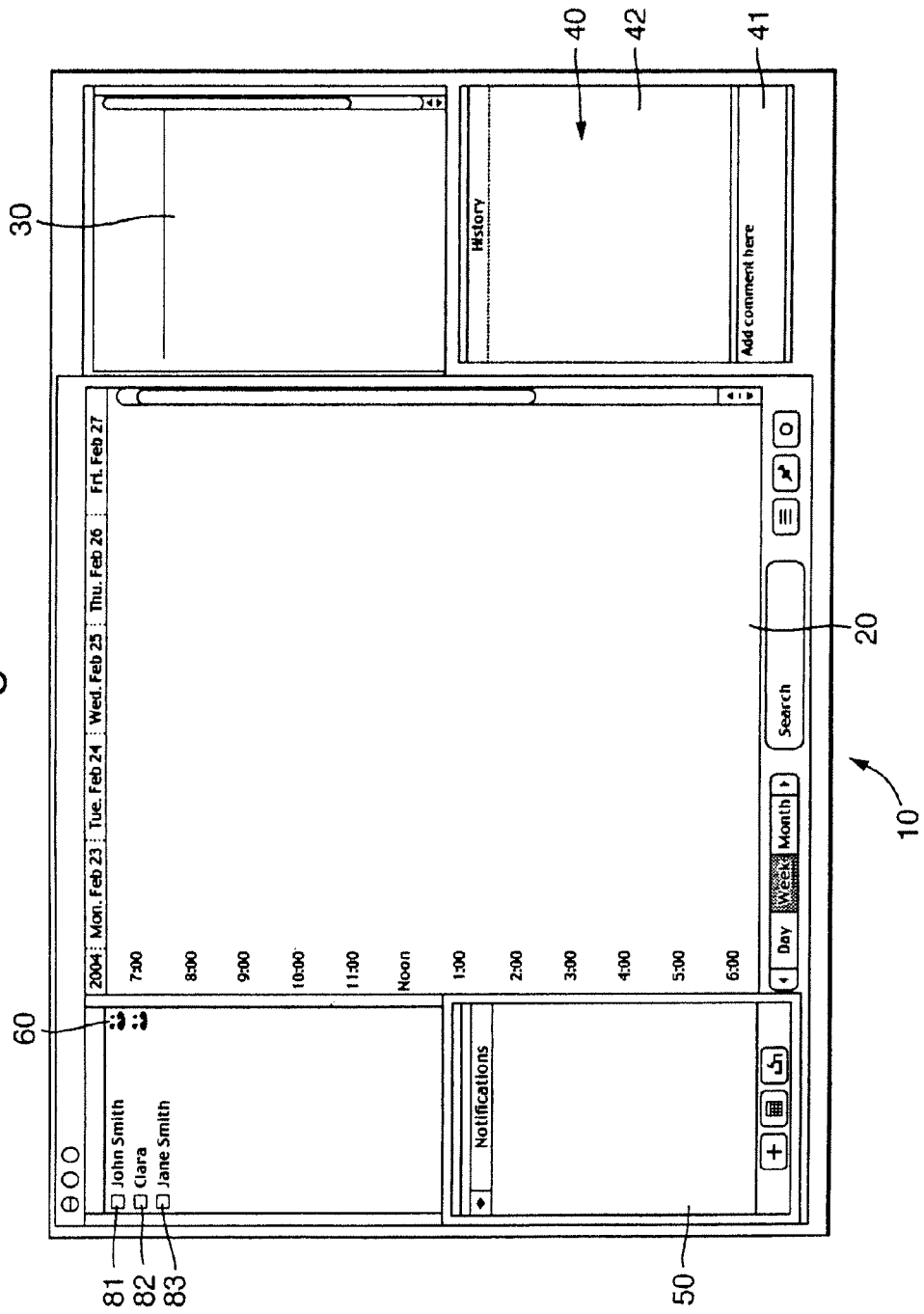
FIG. 13 is another view of a calendar user interface of the present invention.

FIG. 13 illustrates the display of the UI 10 for another user, who has access to John Smith's calendars. This is indicated in the calendar list 60 by the heading 81 for "John Smith". Again, the group icon positioned to the right of the heading 81 shows that John Smith's calendars are shared calendars. Headings 82 and 83 in the calendar list 60 show that user also has access to Clara's shared calendars and to Jane Smith's calendars. However, in view of the absence of a group icon to the right of the Jane Smith heading 83, it can be assumed that the user viewing the UI 10 is Jane Smith and that her calendars are not shared with other users.

In this example, a check-box, which can be checked using a mouse, is provided to the left of each of the headings 81, 82, 83. In FIG. 13 none of these check-boxes is checked and consequently no calendars are displayed.

Figure 14:
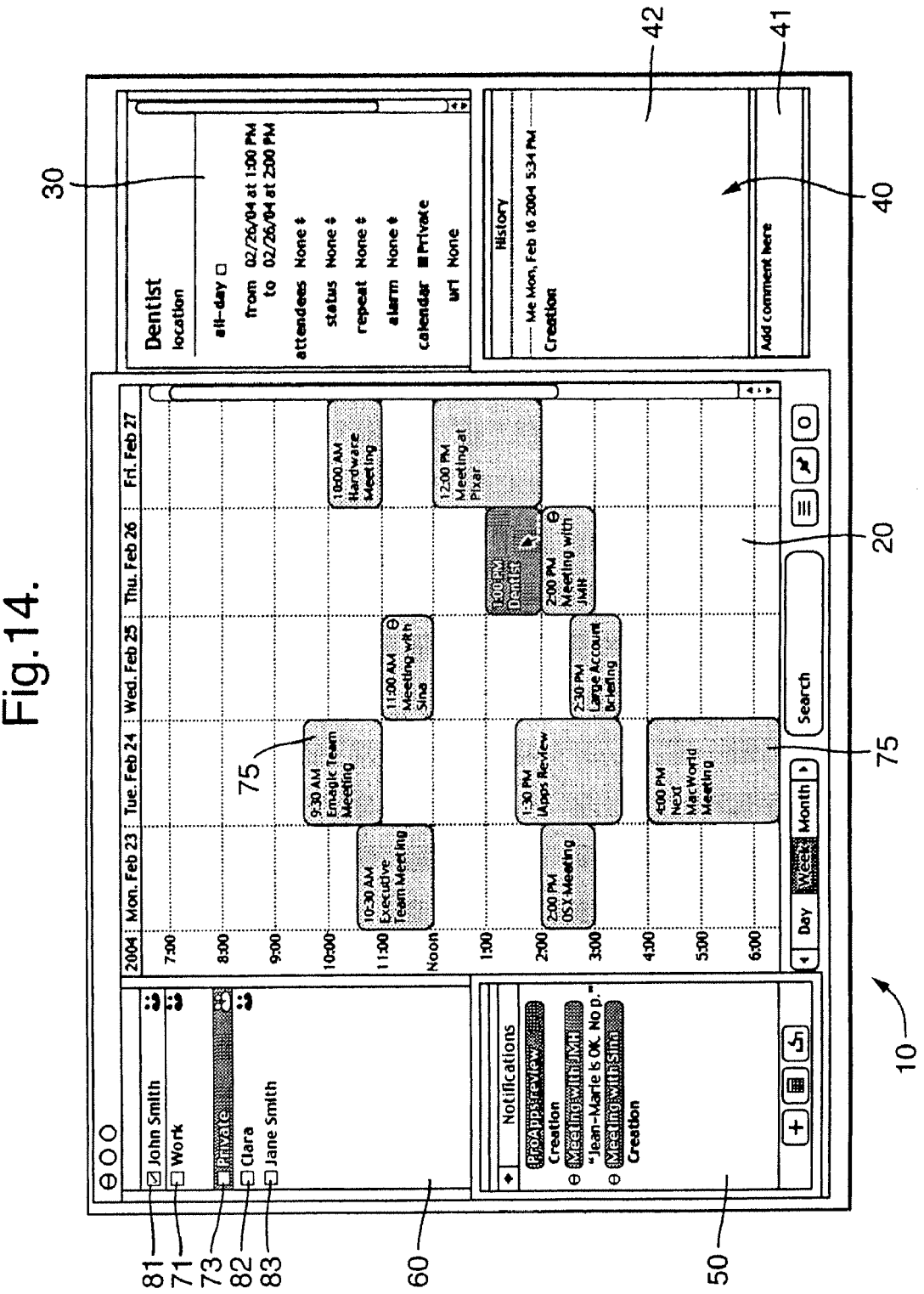
FIG. 14 is a still further view of a calendar user interface of the present invention.

In FIG. 14, the check-box to the left of the John Smith heading 81 is checked and consequently the headings 71, 73 of John Smith's shared calendars (work and private) are displayed in the calendar list window 60 as sub-headings. The check-boxes to the left of both these sub-headings 71, 73 are also checked and consequently the appropriate information is shown in the calendar main view 20, the inspector window 30, the history window 40 and the notification window 50. However, the check-boxes to the left of the main headings 82, 83 for Clara's and Jane Smith's calendars remain unchecked and so no information relating to events from these calendars is shown in the other windows. However, they may be checked simultaneously with the check-box associated with John Smith's calendars or with each other. Similarly, any combination of the check-boxes of sub-headings may be checked simultaneously. Accordingly, the calendar main view 20 can be used to display the events of all calendars to which the user has access at the same time. Moreover, the inspector, history and notification windows 30, 40, 50 may be used to view the details of any event selected in the calendar main view 20.

Moreover, in this example, John Smith may be logged on to the laptop 101 in FIG. 2, Jane Smith may be logged on to the desktop 105 in FIG. 2 and Clara may be logged on to the desktop 110 in FIG. 2. Jane Smith is the wife of John Smith and Clara is a work colleague of John Smith. John Smith has the three calendars shown in FIGS. 1 and 14 and shares his work and personal calendars with both Jane Smith and Clara. Thus, the displays of the UI 10 shown in FIGS. 13 and 14 are displays of the UI that might be seen by Jane Smith in this example.

Moreover, since each users calendars are grouped together under a single name, each of the other users is able to quickly access all the calendars of any selected other user for which he has sharing rights. Specifically, each user is able to check a user heading 81, 82, 83 in the calendar list window 60 to call up a list of all shared calendars owned by the checked user. If desired, more than one user heading may be checked at one time. In that case a list of all shared calendars owned by each of the checked users will be displayed. The user is then able to click on the sub-headings for each of the listed calendars to determine which should be displayed in the calendar main view 20. Finally, the user is able to highlight any selected event 75 in the calendar main view 20 by means of the mouse and the appropriate information will be displayed in the inspector and history windows 30, 40.

In a preferred embodiment, each user may log on to different devices with their user name. For example, in FIG. 2 laptop 101 may have a first user logged on as User 1, desktop 105 may have a second user logged on as User 2 and laptop 110 may have a third user logged on as User 3. However, at another time Users 1 to 3 could conceivably be logged on to different computers. That is, it may also be possible to log on to desktops 105, 110 as User 1 and so on.

Accordingly, a first user (such as John Smith) could log on to any of the laptop 101 or desktop 105, 110 computers at different times. Thus, as an example, he could make a change to his work calendar 71 one evening using the desktop computer 105. The next morning, he could log on to the laptop computer 101 and connect with the .Mac™ server 131. His work calendar on the laptop computer 101 would automatically be updated. This unification of data from different transports—a .Mac™ server 131, a generic server 141 and a RendezVous™ network—can be termed "roaming".

This ability to allow users to change their calendars at different computers and for the changes to be disseminated to all the devices and users sharing the calendar is a powerful tool that is of great benefit to users. However, it also introduces additional complexity into the calendaring system. In particular, it would be possible for a first user to travel away from the office on a business trip or a vacation. While the first user is away from the office, other users could make changes to any one of his shared calendars. There is no difficulty in the first user viewing the changes, using the calendar main view 20 and the inspector, history and notification windows 30, 40, 50 in the UI 10. However, the other users will be unaware of whether the first user is aware of the changes.

To overcome this problem, one embodiment of the present invention further provides a message or other indication to the other users when the first user has opened his calendars and reviewed any changes. The notification may be provided to the other users through the notification window 50. It will be apparent to persons skilled in the art that several different triggers could be used for such a "review" message or indication.

For example, when the first user clicks on the bullet point to the left of a notification title in the notification window 50, this could trigger a notification to the other users in their respective notification and/or history windows 50, 40 that he has reviewed the change.

In an alternative embodiment of the present invention, each time the first user views one of his shared calendars, the time he viewed it is recorded adjacent his user heading 81, 82, 83 in the calendar list window 60. This provides a simple mechanism for allowing users to establish when other users last inspected their calendars.

Other implementations of the present invention will be immediately apparent to those skilled in the art.

The aforegoing description has been given by way of example only and it will be appreciated by a person skilled in the art that modifications can be made without departing from the spirit and scope of the present invention.

We claim:

1. A computer readable storage medium for a digital processing system, the storage medium storing program code that when processed by the digital processing system of a first user causes the digital processing system to perform a method, the method comprising:

receiving a respective calendar of events for at least one other user;

sending to a respective electronic system of the at least one other user a first calendar of the first user's activities and a second calendar of the first user's activities, the first calendar containing first activities of the first user, the second calendar containing second activities of the first user;

receiving a modification created by the at least one other user to one of the first or second calendars of the first user's activities, the modification being one of:
  i) a new event;
  ii) change to an existing event;

wherein, the modification is appended with a message from the at least one other user, and wherein, the receiving does not include the first user actively fetching the modification and/or message from a server where the modification and/or message is posted;

automatically displaying the modification and the message substantially simultaneously on a display of the digital processing system in an updated calendar;

sending notice to the respective electronic system of the at least one other user that the first user is are of the modification, the sending being triggered by any of the following:
  (i) the first user affirmatively taking action in a region of the display of the digital processing system that is reserved for the first user to acknowledge the modification;
  (ii) the display of the digital processing system rendering, for the first time since the modification was received by the digital processing system, the one of the first user's first and second calendar of activities to which the modification was made.

2. The computer readable storage medium of claim 1, wherein the modification comprises a change to at least one of a start time of the event, an end time of the event, a description of the event, a status of the event, whether the event is to be repeated and the persons attending the event.

3. The computer readable storage medium of claim 1, wherein the method further comprises displaying on the display of the digital processing system at least one of an identification of the at least one other user who created the modification, a time at which the modification was made and a description of the modification.

4. The computer readable storage medium of claim 1, wherein the method further comprises displaying on the display of the digital processing system for a selected event all changes made to the event.

5. The computer readable storage medium of claim 1, wherein the method further comprises displaying on the display of the digital processing system for a selected event all messages relating the event.

6. A digital processing system for a first user, the digital processing system having a processor and a storage medium, the storage medium having stored program, code that when processed by the digital processing system causes a method to he performed by the digital processing system, the method comprising:

receiving a respective calendar of events for at least one other user;

sending to a respective electronic system of the at least one other user a first calendar of the first user's activities and a second calendar of the first user's activities, the first calendar containing first activities of the first user, the second calendar containing second activities of the first user;

receiving a modification created by the at least one other user to one of the first or second calendars of the first user's activities, the modification being one of:
i) a new event;
ii) a change to an existing event;

wherein, the modification is appended with a message from the at least one other user, and wherein, the receiving does not include the first user actively fetching the modification and/or message from a server where the modification and/or message is posted;

automatically displaying the modification and the message substantially simultaneously on a display of the digital processing system in an updated calendar;

sending notice to the respective electronic system of the at least one other user that the first user is aware of the modification, the sending being triggered by any of the following:
(i) the first user affirmatively taking action in a region of the display of the digital processing system that is reserved for the first user to acknowledge the modification;
(ii) the display of the digital processing system rendering, for the first time since the modification was received by the digital processing system, the one if the first user's first and second calendar of activities to which the modification was made.

7. The digital processing system of claim 6, wherein the modification comprises a change to at least one of a start time of the event, an end time of the event, a description of the event, a status if the event, whether the event is to be repeated and the persons attending the event.

8. The digital processing system of claim 6, wherein the method further comprises displaying on the display of the digital processing system at least one of an identification of the at least one other user who created the modification, a time at which the modification was made and a description of the modification.

9. The digital processing system of claim 6, wherein the method further comprises displaying on the display of the digital processing system for a selected event all changes made to the event.

10. The digital processing system of claim 6, wherein the method further comprises displaying on the display of the digital processing system for a selected event all messages relating to the event.

11. A method performed on a digital processing system for a first user, the method comprising:
receiving a respective calendar of events for at least one other user;
sending to a respective electronic system of the at least one other user a first calendar of the first user's activities and a second calendar of the first user's activities, the first calendar containing first activities of the first user, the second calendar containing second activities of the first user;
receiving a modification created by the at least one other user to one of the first or second calendars of the first user's activities, the modification being one of:
i) a new event;
ii) a change to an existing event;

wherein, the modification is appended with a message from the at least one other user, and wherein, the receiving does not include the first user actively fetching the modification and/or message from a server where the modification and/or message is posted;

automatically displaying the modification and the message substantially simultaneously on a display of the digital processing system in an updated calendar;

sending notice to the respective electronic system of the at least one other user that the first user is aware of the modification, the sending being triggered by any of the following:
(i) the first user affirmatively taking action in a region of the display of the digital processing system that is reserved for the first user to acknowledge the modification;
(ii) the display of the digital processing system rendering, for the first time since the modification was received by the digital processing system, the one of the first user's first and second calendar of activities to which the modification was made.

12. The method of claim 11, wherein the modification comprises a change to at least one of a start time of the event, an end time of the event, a description of the event, a status of the event, whether the event is to be repeated and the persons attending the event.

13. The method of claim 11, wherein the method further comprises displaying on the display of the digital processing system at least one of an identification of the at least one other user who created the modification, a time at which the modification was made and a description of the modification.

14. The method of claim 11, wherein the method further comprises displaying on the display of the digital processing system for a selected event all changes made to the event.

15. The method of claim 11, wherein the method further comprises displaying on the display of the digital processing system for a selected event all messages relating to the event.

* * * * *